United States Patent [19]

Tokumasu et al.

[11] Patent Number: 5,566,281

[45] Date of Patent: Oct. 15, 1996

[54] METHOD AND APPARATUS FOR GENERATING A SURFACE BY SIMULATING A PHYSICAL MEMBRANE

[75] Inventors: Shinji Tokumasu; Norihiro Nakajima; Ichiro Harashima; Hiroshi Arai, all of Hitachi, Japan

[73] Assignee: Hitachi, Ltd., Tokyo, Japan

[21] Appl. No.: 81,203

[22] Filed: Jun. 25, 1993

[30] Foreign Application Priority Data

Jun. 25, 1992 [JP] Japan .................................. 4-167528

[51] Int. Cl.$^6$ .................................................. G06T 17/00
[52] U.S. Cl. ............................................ 395/120; 395/142
[58] Field of Search ................................... 395/120, 142

[56] References Cited

U.S. PATENT DOCUMENTS 5,345,546  9/1994  Harada et al. ......................... 395/142

OTHER PUBLICATIONS

Böhm et al., "A Survey of Curve and Surface Methods in CAGD", Computer Aided Geometric Design, 1 (1984), pp. 1–60.

"Using Partial Differential Equations to Generate Free--Form Surfaces" (paragraph : "Simple Hull Design"), Computer Aided Design, Bloor, et al, vol. 22, No. 4, May 1990, UK, pp. 202–212.

"On the G$^1$ Continuity of Piecewise Bezier Surfaces: A review with New Results", Wen–Hui Du et al, Computer Aided Designs, vol. 22, No. 9, Nov. 1990, UK, pp. 556–573.

"Surface Reconstruction Using Deformable Models with Interior and Boundary Constraints", Proceedings Third International Conference on Computer Vision, Wang et al, Nov. 1990, JP, pp. 300–303.

"Connecting Arbitrary Surfaces Under Geometric Constraints", Computers In Industry, Vergeest, vol. 8, No. 1, Feb. 1987, NL, pp. 3–12.

*Primary Examiner*—Mark K. Zimmerman
*Attorney, Agent, or Firm*—Antonelli, Terry, Stout & Kraus

[57] ABSTRACT

In order to generate a display of a surface, an equation or equations are generated corresponding to all or parts of the surface. The equation or equations represent the surface as a physical membrane. Boundary conditions of the surface can thus be specified, and the equation solved using the boundary conditions as outer constraints to generate a display of the surface. A set of points within the boundary of the surface may be specified, which then define inner constraints for the solution of the equation. Where parts of the surface join at a point or line, a further equation can be generated, which further equation represents the area around the join as a physical membrane. Solution of that equation, preserving the boundary of the area around the join, provides a smooth transition between the parts of the surface.

14 Claims, 6 Drawing Sheets

○ Free node
⊙ Restraint node
● Boundary node

METHOD AND APPARATUS FOR GENERATING A SURFACE BY SIMULATING A PHYSICAL MEMBRANE

BACKGROUND OF THE INVENTION

1. Field of the Invention

The present invention relates to a method of generating a display of a surface. It is particularly, but not exclusively, concerned with such a method as applied to the generation of curved or shaped surfaces in computer-aided design (CAD) and and/or computed-aided manufacturing (CAM). The present invention also relates to an apparatus for generating a display of a surface.

2. Summary of the Prior Art

It is now common for CAD/CAM systems to be used to design objects such as furniture, automobiles etc., using computers.

The first stage in the design of an object involves the generation of a skeleton of that object, which skeleton comprises shape characteristic lines defining an outline of the object to be generated. The resulting structure is known as a wireframe. Normally, additional lines are then added to the wireframe so that the lines define a multiplicity of adjacent quadrilaterals in a three-dimensional space. Next, curved surfaces are generated to define the shape of the surface within each of the quadrilaterals, which curve surfaces are known as quadrilateral patches.

When the quadrilateral patches are generated, they must adjoin so that the connection therebetween is smooth, so that the object will have a smooth surface. When each quadrilateral patch is generated, points on the patch are represented by vector functions, and there is a smooth transition of the vector functions over the quadrilateral patch. The vector functions normally used are Bezier or B-spline bi-cubic expressions with two parameters, because use of those expressions makes the resulting calculations relatively straightforward.

Generally, known methods have been limited to the use of quadrilateral patches. It has been found, however, that complex processing is needed to achieve a smooth connection between adjacent patches. Furthermore, if the whole of the surface has to be expressed by quadrilaterals, it is sometimes difficult to represent accurately the surface of the object desired. Thus, it is desirable to permit an arbitrary shape to be represented more easily.

In order to reduce the latter problem, JP-A-63-159982 proposed that trilateral patches be used in addition to quadrilateral patches. Use of both trilateral and quadrilateral patches sometimes make it easier to define the surface of the object. However, it was then still necessary to ensure that the trilateral and quadrilateral patches were connected together smoothly.

To address the problem of connecting the patches together smoothly, JP-A-3-68098 proposed that the gradients on both sides of a line representing the join of adjacent patches be the same, so as to impose a surface continuity condition on the patch surfaces. However, if an excessive amount of processing was to be avoided, it was necessary to limit the number of points along the line joining the two surfaces for which gradients were assessed. Alternatively, in JP-A-3-228181, a imaginary ball of a suitable radius was rolled so that it maintained contact with the two adjacent surfaces along the line, of join. The shape of the join was then modified to correspond to the locus of the surface of the ball between the contact points of the ball and the surfaces.

SUMMARY OF THE PRESENT INVENTION

In JP-A-4-280374 (published after the priority date of the present application and corresponding to U.S. patent application Ser. No. 07/848,135, the disclosure of which is incorporated herein by reference), it was proposed that the surface of the desired object be represented by a plurality of patches, each having a single curved surface with a three-dimensional boundary curve of an arbitrary shape. Then, for each of the surfaces, an equation which was a differential equation which represented the surface as a physical membrane was generated. That membrane could be considered to deform to change the shape of the surface, and such deformations could be represented as changes in parameters of the corresponding equation. Thus, by specifying the boundaries of the membrane for each patch, and specifying a deformation of the surface within the patch (which is equivalent to the application of a force to a part of the membrane), it then becomes possible to define patches of arbitrary shape and curvature. The present invention was made as a development of the arrangement proposed in JP-A-4-280374 (U.S. Ser. No. 07/848,135).

A first aspect of the present invention is concerned with the deformation of the shape of the surface of the patch. While it is possible to modify that shape by altering the parameters of the equation defining the corresponding membrane, the present inventors have realized that there are situations where it is necessary for points on the surface to be fixed. Therefore, the first aspect of the present invention proposes that a set of points can be defined within the boundary of the surface, and those points then act as constraints on the permitted deformation of the corresponding membrane. Since the boundary of the surface also defines constraints on the equation, the latter will hereinafter be referred to as defining outer constraints and the set of points then define inner constraints for the equation. By solving the equation using both the inner and outer constraints, a display can be generated corresponding to the surface. That surface may then be displayed on a suitable display device.

By causing points to act as inner constraints for the equation corresponding to a physical membrane, the processing needed to generate the display corresponding to the surface is simplified, and thus processing can be speeded up.

The set of points may be discrete points within the boundary of the surface. However, the set of point may define a line on the surface, either open or closed, or may define an area on the surface. Thus, it is possible to specify discrete points, lines or areas within the patch.

Thus, a surface can be defined in a three-dimensional space which is defined by a boundary curve, and an equation which corresponds to a physical membrane representing that surface can be generated. When a set of points (hereinafter referred to as intraplane restraint points) are specified, the membrane may be considered as fixed at those intraplane restraint points, and thus the points act as inner constraints for the solution of the equation corresponding to the membrane. Of course, that solution is also constrained by the boundary curve being the edge of the surface. Thus, the user of the present invention need specify only the boundary curve and the set of intraplane restraint points in order to generate the surface desired. Thus, the actions of the user in generating a suitable surface are simplified.

The second aspect of the present invention seeks to ensure that the patches join smoothly. It is readily possible to ensure that the patches join by providing adjacent patches with a common boundary, but it is also necessary to ensure that that boundary represents a smooth transition from one patch to the other. The arrangement of JP-A-4-280374 (U.S. Ser. No. 07/848,135) may be used to generate surfaces corresponding to each patch. However, JP-A-4-280374 (U.S. Ser. No. 07/848,135) did not discuss the joining of those surfaces.

In the second aspect of the present invention, a join area is defined which join area comprises a part of each of the original patches adjacent the join of the patches. Another equation can then be generated, which represents the join area as a physical membrane, with the boundary of the join area as a boundary condition. By solving that equation while preserving the boundary of the join area, a smooth transition from one patch to the other can be achieved. The resulting surface corresponding to the join area is hereinafter referred to as a fillet surface. Then, the display can be generated using the patch surfaces and the fillet surface.

It will be appreciated that the second aspect of the present invention is applicable both to the case where two surfaces meet at a line, and where three or more surfaces meet at a point. In each case, an area of each surface adjacent to the join (whether line or point) is considered when the join area is defined.

In a development of the second aspect, the join (whether line or point) may itself be considered as fixed, so that it is an inner constraint on the solution of the equation corresponding to the membrane representing the join area, as in the first aspect of the present invention.

Thus, when two surfaces (patches) of arbitrary shape meet, the user of the present invention need only identify the line of joining of those surfaces, and the corresponding fillet surface can then be generated automatically. Similarly, when there are three or more adjoining patches, the user need specify only the common point of those patches and again the corresponding fillet surface can then be generated automatically. Thus, a smooth surface can be generated easily and quickly without complex processing. The arrangement disclosed in JP-A- 280374 (U.S. Ser. No. 07/848,135) are thus applied not only to the surfaces of the patches themselves, but also to the join area adjacent the join of two or more patches, so that a smooth surface can be achieved not only over the patches themselves, but between the patches.

The present invention relates to both an apparatus and a method for carrying out the above two aspects of the present invention.

BRIEF DESCRIPTION OF THE DRAWINGS

Embodiments of the present invention will now be described in detail, by way of example, with reference to the accompanying drawings in which.

DETAILED DESCRIPTION

A first embodiment of the present invention will now be described, referring to FIGS. 1 to 4 of the accompanying drawings.

Figure 1:
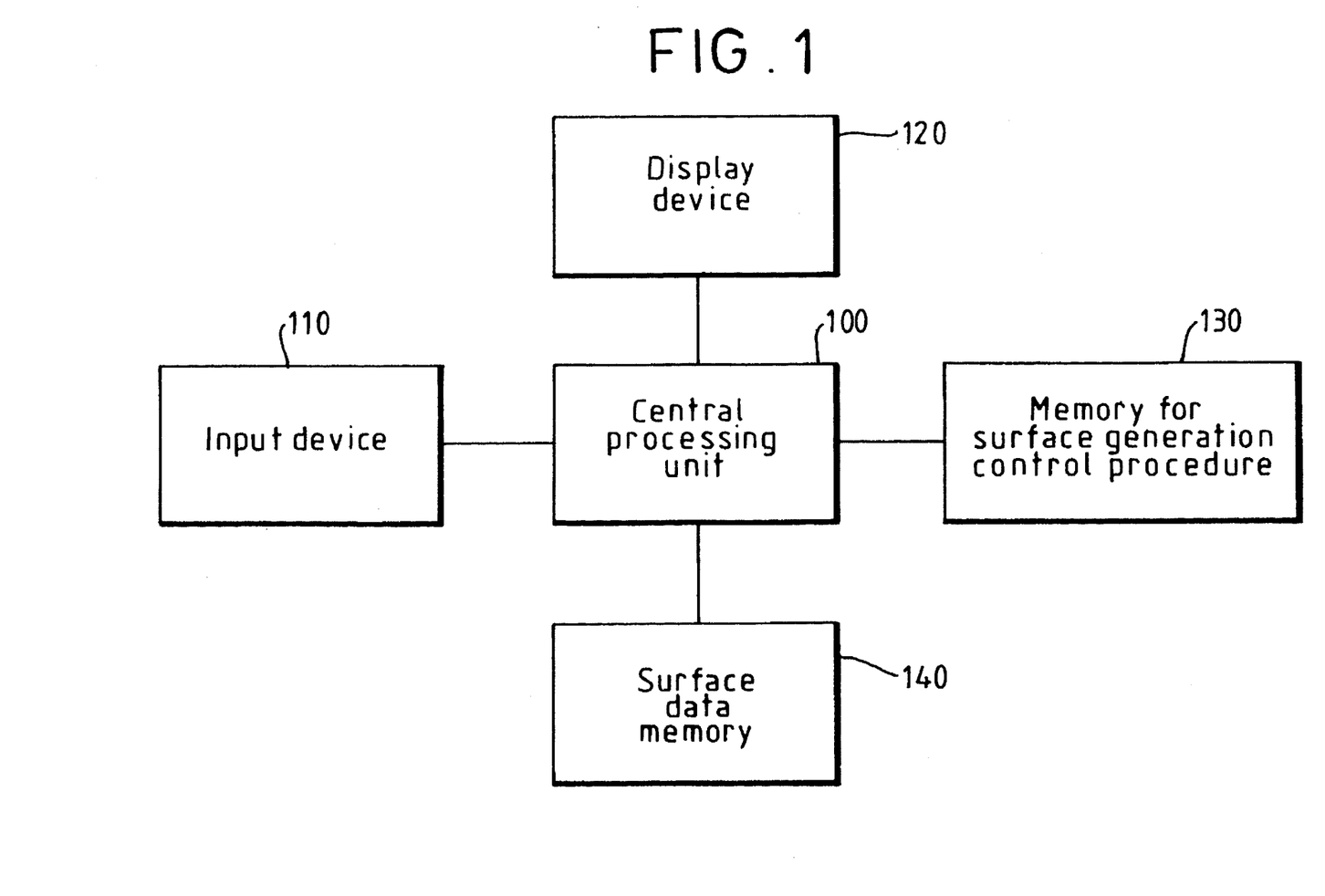
FIG. 1 is a block diagram of an apparatus for generating a curved surface, being an embodiment of the present invention.

FIG. 1 shows the configuration of a curved surface generation apparatus according to the present invention. In the curved surface generation apparatus of this embodiment, the operator operates an input device 110 to load a program containing a control procedure for curved surface generation, stored in memory 130, into a central processing unit 100 which executes the program to display on a display device 120 an outline wireframe figure, figures obtained at intermediate stages in the process, and a figure of the final curved surface. These graphic data are stored in a curved surface data memory 140 for use in later procedures.

Figure 2:
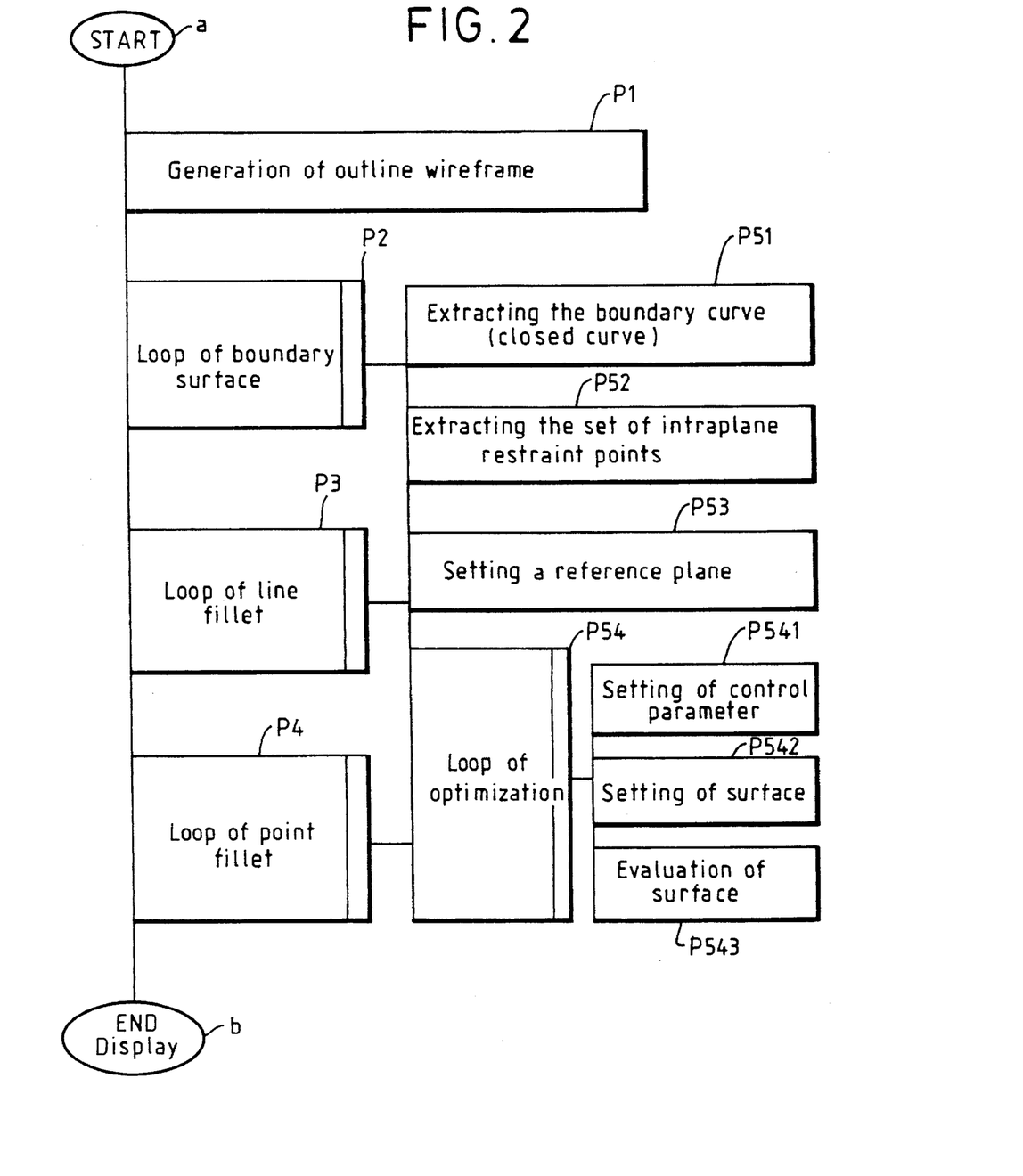
FIG. 2 is a flowchart illustrating the generation of a curved surface according to the present invention.

FIG. 2 shows the general arrangement of the program containing the curved surface generation control procedure discussed above. First, at procedure P1, an outline wireframe is generated. The wireframe may be generated by e.g. any known method. In procedure P2, procedures P51–P54 (to be described in more detail later) are repeated a number of times equal to the number of sectioned boundary surfaces contained in the outline wireframe. Each section boundary surface corresponds to one of the sectioned curved surfaces obtained by dividing the entire curved surface represented by the outline wireframe into sections. For example, when the entire curved surface of a car is drawn, the entire shape can be shown as the combination of a hood section, a windshield section, a tire section, a trunk section and so forth. Each of these sections is a sectioned boundary surface. Such a sectioned boundary surface is a unit used in the process of surface generation.

A group of closed curved lines enclosing the sectioned boundary surfaces are called boundary curved lines. Generally, boundary curved lines comprises one or more closed curved lines making up an external boundary and zero or more closed curved lines representing an internal hole in the surface. In procedures P51, P52 boundary curved lines and a set of intraplane restraint points are identified. Then, in procedure P53, a reference plane is determined, and in procedure P54, a corresponding surface is generated and modified. A sequence of procedures P541, P542, P543 are repeated until the desired surface is obtained. The surface obtained as a result of executing the procedures P51–P54 is referred to herein as a "superpatch".

Procedure P3 is a loop to form a line fillet between two superpatches that adjoin each other at a common line segment. The result of this procedure is also a superpatch. Procedure P4 is a loop to provide a point fillet as a superpatch between three or more superpatches obtained in Procedure P3 that adjoin each other at a common point. In Procedures P2, P3 and P4 somewhat different methods of generating superpatches are used, as will be described later.

Next, the determination of the reference plane performed in procedure P53, the determination of the control parameters performed in procedure P541, and the generation of surfaces performed in procedure P542 will be described in detail.

Figure 3:
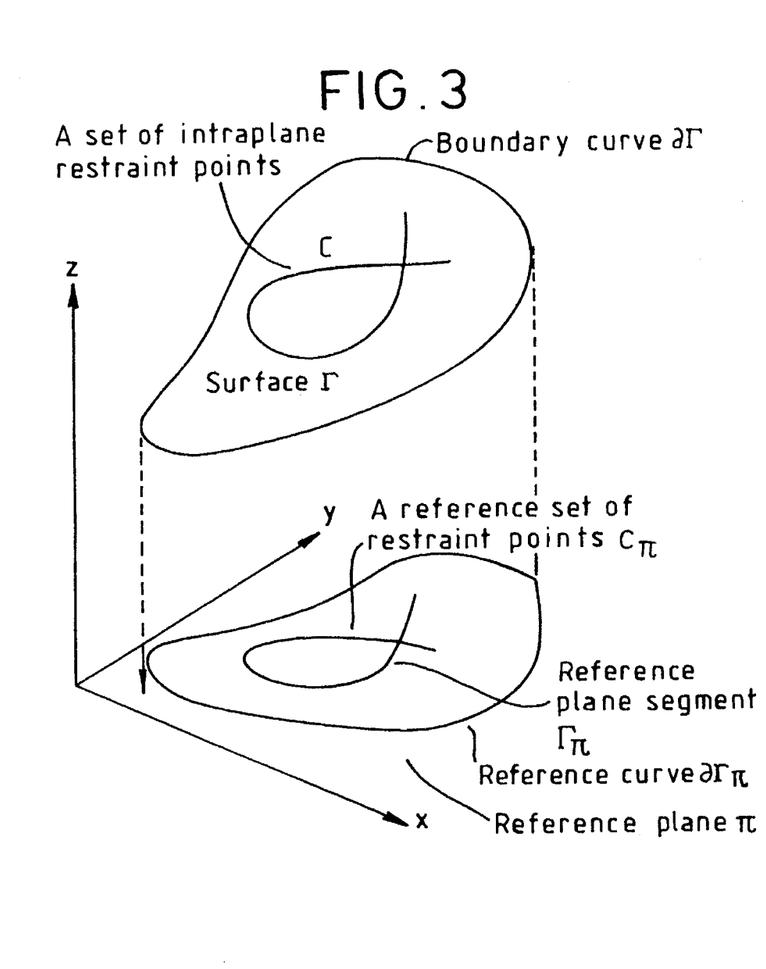
FIG. 3 is a diagram illustrating the relation between a boundary curve, intraplane restraint points, a reference plane, a reference plane segment and a reference set of restraint points of a surface.

First, consider the generation of a superpatch according to procedure P2 (called a source superpatch). FIG. 3 illustrates the generation of a reference surface according to procedure P53. FIG. 3 shows an enclosed curved line ∂Γ (a boundary curved line identified in procedure P51) drawn in a three-dimensional space and a set of intraplane restraint points C (a set of points identified in procedure P52). A plane π is defined with respect to the closed curve ∂Γ. The closed curve ∂Γ and the set of intraplane restraint points C are projected in a direction normal to the plane π onto the plane π. The projected images are then named ∂Γπ (closed curve) and Cπ. The plane π is chosen so that ∂Γπ includes Cπ, ∂Γ and C have one-to-one correspondence with ∂Γπ and Cπ respectively (meaning that each point in the former corresponds one to one to a respective point in the latter), and that the area of a two-dimensional area Γπ enclosed by ∂Γπ is maximized (or is as large as possible). This plane π is taken as a reference plane. This then corresponds to the setting of a reference plane performed in procedure P53. The closed curve ∂Γπ on the plane π is called a reference curve and the two-dimensional area Γπ a reference plane segment. The set of points Cπ is called a reference set of restraint points.

The reference plane segment Γπ can be treated as a membrane surface that deforms according to physical laws, for example, an elastic membrane. The entire reference plane segment Γπ is deformed so that the reference curve ∂Γπ and the reference set of restraint points Cπ are on the boundary curve ∂Γ and the set C of intraplane restraining points. A resulting deformed membrane or curved surface Γ is a superpatch. The curved surface Γ is given by solving Equation 1 below, which defines the deformation of an elastic membrane, under the boundary conditions of Equation 2, 3 and 4.

$$\Delta^2 z = \frac{\partial^4 z}{\partial x^4} + 2 \cdot \frac{\partial^4 z}{\partial x^2 \partial y^2} + \frac{\partial^4 z}{\partial x^4} = h'(x, y) \text{ on } \Gamma\pi \quad \text{Equation 1}$$

$$z = z'(\text{of } \partial\Gamma) \text{ on } \partial\Gamma\pi \quad \text{Equation 2}$$

$$\frac{\partial z}{\partial n} = \frac{\partial z'}{\partial n} \text{ on } \partial\Gamma\pi \quad \text{Equation 3}$$

$$z = z'(\text{of } C) \text{ on } C\pi \quad \text{Equation 4}$$

As a result, the surface γ of a desired shape is uniquely expressed by the following Equation 5.

$$\{z(x,y):(x,Y)\epsilon\Gamma\pi\} \quad \text{Equation 5}$$

In the above equations, "'" is a symbol indicating that the value with which the "'" symbol is associated is a "given" value. Thus, in Equation 1, h'(x,y) represents an added condition, e.g. corresponding to a membrane pressure, to determine the inner shape of the curved surface. This value is specified by the operator. Equation 2 acts as a boundary condition and fixes a curved surface on ∂Γ and defines the plane tangential to the curved surface on ∂Γ. Then Equation 3 gives the gradient of the membrane in the outward direction normal to ∂Γπ. The Equation 4 is another boundary condition that fixes the curved surface to the set C of intraplane restraint points.

Thus, ∂Γ defines outer boundary conditions and the set C defines conditions which can be considered inner boundary conditions since their projection onto the plane π is within the reference curve ∂Γπ.

As described above, by setting the gradient and pressure of the membrane at the edge of the boundary curve, the operator can calculate, using Equation 1, a smooth curved surface shape which has a boundary curve as its edge and contains the set of intraplane restraint points. That curved surface is then displayed on the display device 120.

If the curved surface shape is modified, a similar calculation can be carried out only by modifying the membrane pressure and gradient, and then the modified curved surface may be displayed. In such a way, in this embodiment a curved surface is assumed to correspond to an elastic membrane having physical properties, and a curved surface is automatically generated according to equations representing the elastic membrane. Hence, rapid generation of a desired curved surface that contains a set of intraplane restraint points may be achieved.

Figure 4:
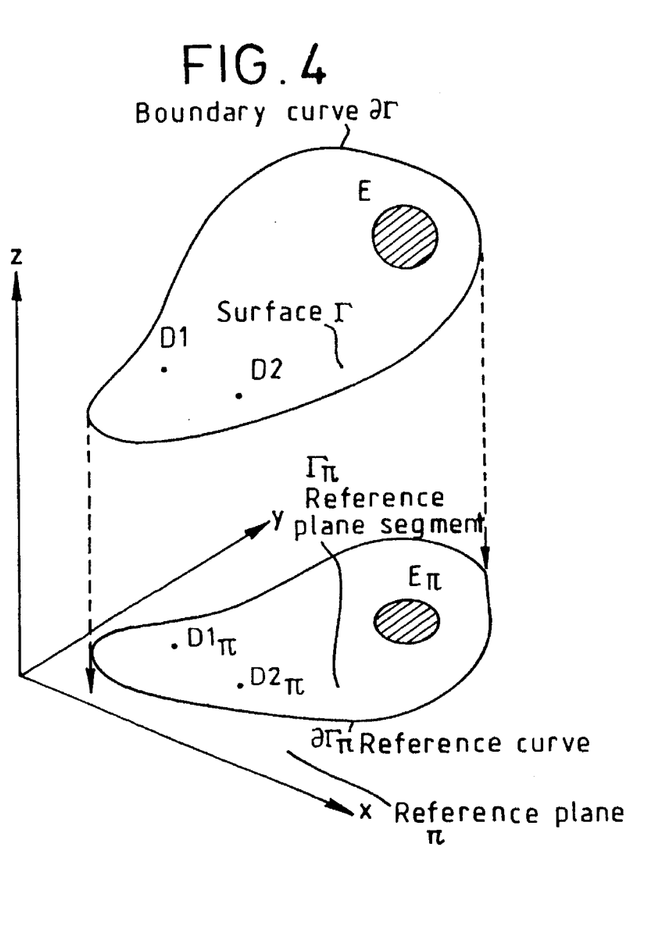
FIG. 4 is a diagram similar to FIG. 3 but illustrating discrete restraint points and restraint points defining an area.

In the arrangement described with reference to FIG. 3, the intraplane restraint points define a line on the surface Γ. As illustrated in FIG. 4, however, this embodiment is also applicable to cases where those intraplane restraint points are discrete points, or define an area. Thus, as shown in FIG. 4, discrete restraint points D1, D2 can be defined, to define corresponding points D1π, D2π on the plane π. Similarly, the intraplane restraint points may define an area E corresponding to area Eπ on the plane π.

Next, referring to FIG. 5 and FIG. 6, another embodiment of surface generation will be described. This embodiment is particularly suitable for cases where closed curves and the set C of intraplane restraint points are both represented as chains of third-order curve segments. In this embodiment, as in the case of FIG. 3, it is necessary to determine a reference plane π for a closed curve ∂Γ and a set C of intraplane restraint points placed in a three-dimensional space, a reference curve ∂Γπ and a reference set of intraplane restraint points Cπ which are projected images of the closed curve ∂Γ and the set C of intraplane restraint points, and the reference plane segment Γπ. Then, as shown, the reference plane segment Γπ is divided into triangles so that those triangles form basic elements of the reference plane section Γπ, to form a Euclidean simplicial complex ΓπΔ. The boundary of the simplicial complex ΓπΔ is ∂ΓπΔ. It is assumed that the nodes on the complex boundary ∂ΓπΔ are also on the reference curve ∂Γπ and that the complex boundary ∂ΓπΔ is a sufficient approximation to the reference curve ∂Γπ. Similarly, it is also assumed that the broken line CπΔ corresponding to the set of reference restraint points Cπ has its nodes placed on Cπ and approximates the points Cπ. To distinguish between the coordinates on the complex ΓπΔ and the coordinates on the reference plane segment Γπ (x,y), the x and y axes are copied onto the reference plane π, being named ξ and η axes to represent points on the complex ΓπΔ using the coordinates (ξ,η). In this embodiment, the desired surface Γ corresponding to Equation 5 is expressed by the Equation 6 below, with (ξ,η) taken as the parameters.

$$\{x(\xi,\eta),y(\xi,\eta),z(\xi,\eta):(\xi,\eta)\epsilon\Gamma\pi\Delta\} \quad \text{Equation 6}$$

It is further assumed that the components x, y, z of the surface are determined independently by solving the respective equation of a membrane having physical properties. For example, these components can be treated as those corresponding to the same equation that represents the properties of the elastic membrane. For simplicity, a symbol "φ" is introduced to represent the components x, y, z. Then, the following Equations 7 to 10 below, corresponding to Equations 1 to 4 can be obtained.

$$\Delta^2\phi = \frac{\partial^4\phi}{\partial\xi^4} + 2 \cdot \frac{\partial^4\phi}{\partial\xi^2\partial\eta^2} + \frac{\partial^4\phi}{\partial\eta^4} = h'(\xi, \eta) \text{ on } \Gamma\pi \quad \text{Equation 7}$$

$$\phi = \phi'(\text{of } \partial\Gamma) \text{ on } \partial\Gamma\pi\Delta \quad \text{Equation 8}$$

-continued $$\frac{\partial \phi}{\partial n} = \frac{\partial \phi'}{\partial n} \text{ on } \partial \Gamma \pi \Delta \qquad \text{Equation 9}$$

$$\phi = \phi' (\text{of } C) \text{ on } C \pi \Delta \qquad \text{Equation 10}$$

Solving Equation 7 is the same as solving the following variational problem under the conditions of Equations 8 to 10. Thus, it is possible to solve the problem corresponding to Equation 11 below.

$$\delta \Pi(\phi) = 0 \qquad \text{Equation 11}$$

$\Pi(\phi)$ may be expressed as in the form of Equation 12 shown below.

$$\Pi(\phi) = \frac{1}{2} \int\int_{\Gamma \pi \Delta} \left\{ \left( \frac{\partial^2 \phi}{\partial \xi^2} \right)^2 + 2 \left( \frac{\partial^2 \phi}{\partial \xi \partial \eta} \right)^2 + \left( \frac{\partial^2 \phi}{\partial \eta^2} \right)^2 \right\} d\xi d\eta - \int\int_{\Gamma \pi \Delta} \phi \cdot h \, d\xi d\eta \qquad \text{Equation 12}$$

Figure 6:
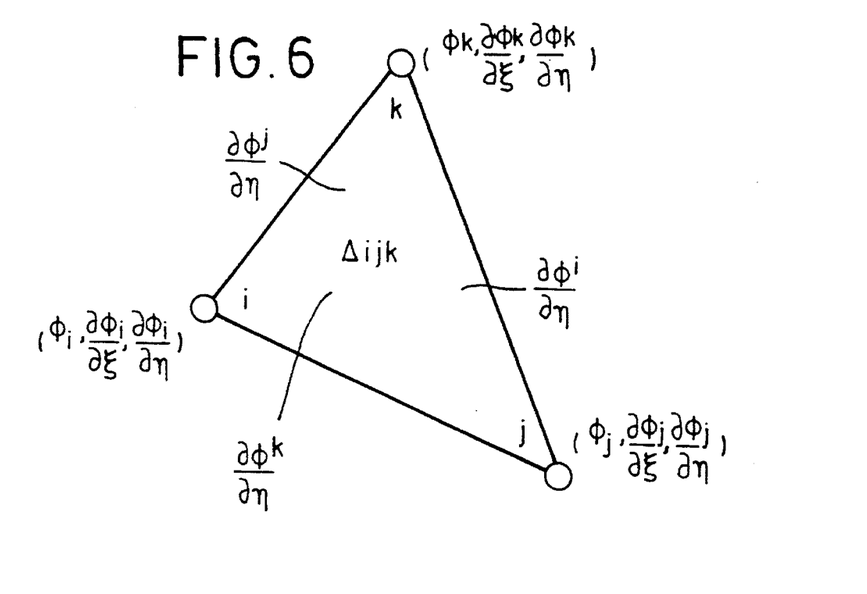
FIG. 6 is a diagram showing parameters used in the interpolation equation of a simplex element.

It is further assumed that the value of the function $\phi$ in each simplex $\Delta ijk$ making up the complex $\Gamma \pi \Delta$ is defined by an interpolation function $\phi ijk$ which is determined by the 12 parameters shown in FIG. 6. Thus, the value is expressed by Equation 13.

$$\phi(\xi, \eta) \equiv \qquad \text{Equation 13}$$

$$\phi_{ijk}\left( \xi, \eta : \left\{ \phi_t, \frac{\partial \phi_t}{\partial \xi}, \frac{\partial \phi_t}{\partial \eta} \right\}, \left\{ \frac{\partial \phi_s}{\partial n} \right\} ; t, s = i, j, k \right),$$

$$(\xi, \eta) \in \Delta_{ijk}$$

This type of interpolation function can be formed, for example, by an HCT adaptive triangle element method, which is described in "Handbook on Finite Element Method, Basics," by Ichiro Washizu, published by Baifukan, page 261. Using this interpolation function, Equation 12 can be tranformed into discrete elements as given by Equation 14 below.

$$\Pi(\phi) = \sum_{ijk} \Pi(\phi_{ijk}) \qquad \text{Equation 14}$$

$$= \Sigma_{ijk} \left\{ \frac{1}{2} \int\int_{\Delta ijk} \left\{ \left( \frac{\partial^2 \phi_{ijk}}{\partial \xi^2} \right)^2 + 2 \left( \frac{\partial^2 \phi_{ijk}}{\partial \xi \partial \eta} \right)^2 + \left( \frac{\partial^2 \phi_{ijk}}{\partial \eta^2} \right)^2 \right\} d\xi d\eta - \int\int_{\Delta ijk} \phi_{ijk} \cdot h \, d\xi d\eta \right\}$$

The function $\Pi(\phi)$ in Equation 14 is a function in which the variables are parameters $\{\phi, \partial\phi/\partial\xi, \partial\phi/\partial\eta\}$ for each simplex node relating to each $\Delta ijk$ constituting the complex $\Gamma \pi \Delta$, and a parameter $(\partial\phi/\partial n)$ which represents the gradient in the outward direction of the normal at the middle point of a simplex side. By using the above interpolation function, Equations 8 to 10 defining the boundary conditions can be transformed into discrete elements as shown in Equations 15 to 17 below $$\left\{ \phi, \frac{\partial \phi}{\partial \xi}, \frac{\partial \phi}{\partial \eta} \right\} = \left\{ \phi', \frac{\partial \phi'}{\partial \xi}, \frac{\partial \phi'}{\partial \eta} \right\} \text{ on every node of } \partial\Gamma_{\pi\Delta} \qquad \text{Equation 15}$$

$$\left\{ \frac{\partial \phi}{\partial n} \right\} = \left\{ \frac{\partial \phi'}{\partial n} \right\} \text{ on every edge of } \partial\Gamma_{\pi\Delta} \qquad \text{Equation 16}$$

(a) $\{\phi\} = \{\phi'\}$ on every node of $C_{\pi\Delta}$ Equation 17

Figure 5:
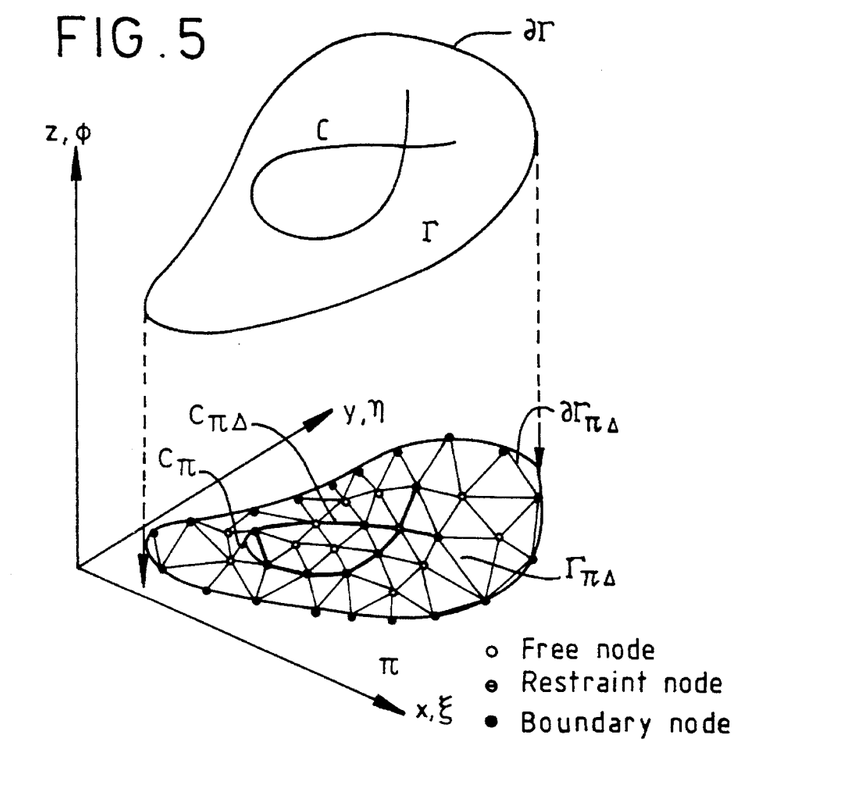
FIG. 5 is a diagram corresponding to FIG. 3 but showing the division of the reference plane segment into a simplicial complex.

(b) $\left\{ \frac{\partial \phi}{\partial \xi}, \frac{\partial \phi}{\partial \eta} \right\} = \left\{ \frac{\partial \phi'}{\partial \xi}, \frac{\partial \phi'}{\partial \eta} \right\}$ on every node of $C_{\pi\Delta}$ -continued (c) $\left\{ \frac{\partial \phi}{\partial n} \right\} = \left\{ \frac{\partial \phi'}{\partial n} \right\}$ on every edge of $C_{\pi\Delta}$ The relationship given by Equation 15 defines the targeted boundary points of tangency shown in FIG. 5, with the condition that the desired surface $\Gamma$ gives the boundary curve $\partial \Gamma$. When the boundary curve is given as a chain of third-order curve segments, it is possible to set the equation so that the desired surface $\Gamma$ strictly provides the boundary curve $\partial \Gamma$. Equation 16 is a part that can be determined by the operator. It is also possible to automatically set Equation 16 automatically according to certain rules determined in advance. Equation 17 is determined by the condition that the curve $\Gamma$ is restrained by the set C of intraplane restraint points.

If the concept of restraint includes limited latitude, it is possible to use either (a), (b) or (c) alone of Equation (17) or a combination of them as the relationship defining this condition. For example, when only (a) is used, only the coordinate values of restraint nodes, (a group of discrete points), on $C\pi\Delta$ are defined. Even under this condition alone, it is possible to make the desired curve $\Gamma$ include intraplane restraint points included in the set C and corresponding to the set of discrete node points and approximately include the entire set C of intraplane restraint points. When the set C of intraplane restraint points is given as a chain of third-order curve segments similarly to the boundary curve, Equations (a) and (b) can be combined to strictly restrain the desired surface $\Gamma$ strictly to the restraint curve C.

If Equation (c) is further combined it is possible to define the tangent plane on the set C of intraplane restraint points. The discrete variational problem (given by Equation (6)) ultimately becomes regular simultaneous linear equations that have undetermined parameters of the interpolation function as unknowns, so that the equations have unique solutions. For these simultaneous equations, various methods of solution are known. For example, the Gauss elimination method can be used.

This embodiment requires the process of dividing reference plane segment $\Gamma\pi$ into triangles. This can be done easily because it is carried out on the reference plane $\pi$. Existing automatic dividing methods can also be used. By dividing the problem into smaller parts in this way, it is possible to generate a smooth curved surface (or a superpatch) that has as its edge the boundary curve which has been extracted as part of the outline wireframe and which includes therein a similarly extracted set C of intraplane restraint points. The superpatch produced in this way is called a "discretely represented" superpatch. In the same way, a patch corresponding to each simplex is called a simplex patch.

Figure 7:
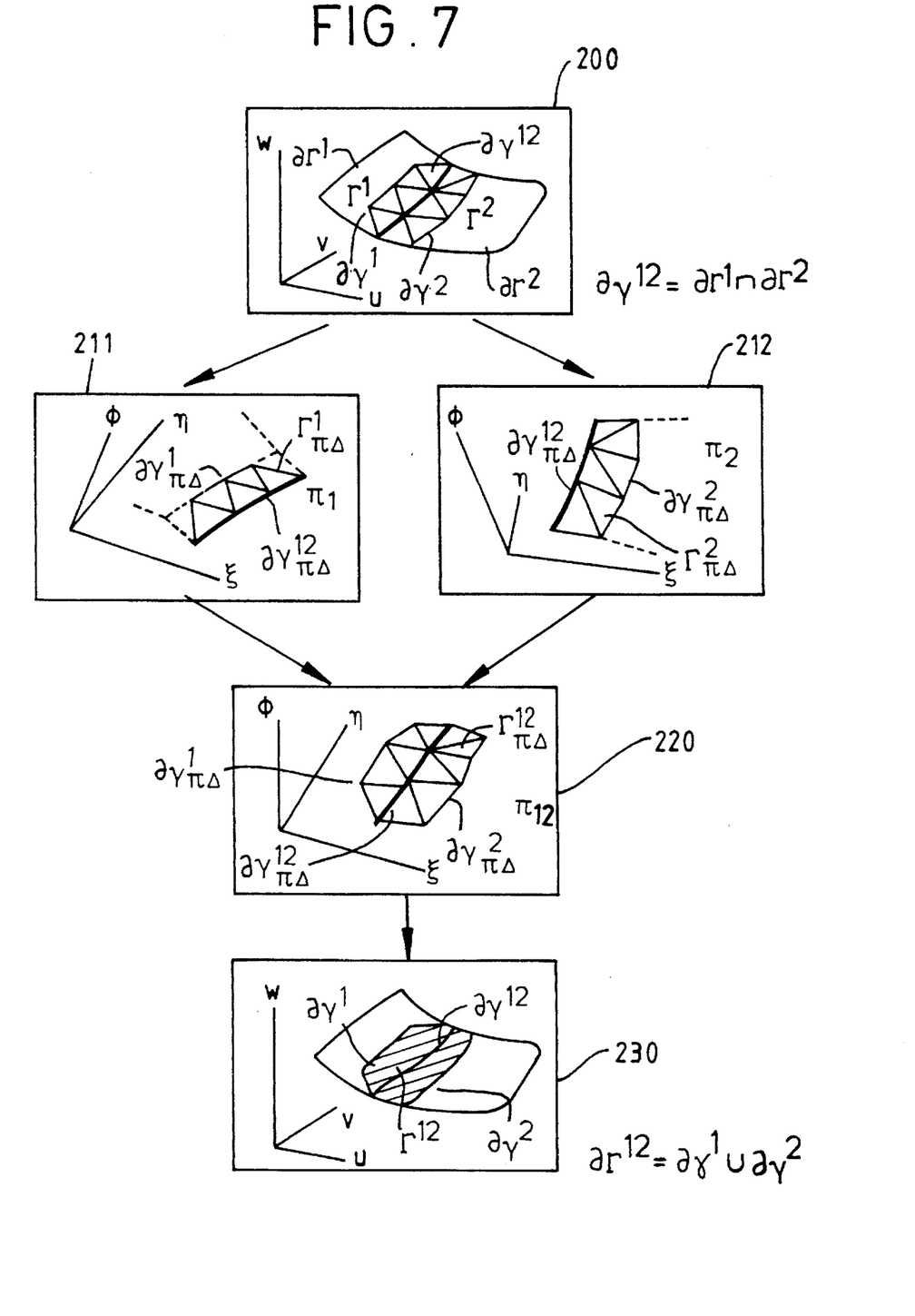
FIG. 7 illustrates the generation of a fillet surface at a line joining two patches.

Next, an embodiment illustrating a method of generating a line fillet, which corresponds to procedure P3 of FIG. 2, will be described, referring to FIG. 7. As shown in procedure

200, assume that two discretely represented superpatches $\Gamma^1$ and $\Gamma^2$ adjoin each other through a common curve segment $\partial\gamma^{12}$ in a common coordinate system (u, v, w).

The procedure for generating a line fillet that connects the two superpatches $\Gamma^1$ and $\Gamma^2$ through the common curve segment $\partial\gamma^{12}$ will now be explained. First, for each superpatch $\Gamma^1$, $\Gamma^2$, a subset of simplex patches, each of which has at least one of its nodes located on the common curve section $\partial\gamma^{12}$ (not including its end points), is selected from the set of simplex patches making up each superpatch. The simplex patches of the subset are then considered separately from the original set of simplex patches. As shown in FIG. 7, the boundaries for these subsets are $\partial\gamma^1$ and $\partial\gamma^2$.

Next, in procedure 211, simplices that correspond to the subset of the simplex patches are extracted from the simplicial complex accompanying the superpatch $\Gamma^1$. Let this set of simplices be $\Gamma^1\pi\Delta$. $\partial\gamma^1\pi\Delta$ and $\partial\gamma^{12}\pi\Delta$ correspond to $\partial\gamma^1$ and $\partial\gamma^{12}$, respectively. A plane $\pi_1$ is the reference plane that defines a local coordinate system ($\xi$, $\eta$, $\phi$) of the superpatch $\Gamma^1$. In procedure 212, an operation similar to procedure 211 is performed on the superpatch $\Gamma^2$, and in procedure 220, a simplicial complex $\Gamma^{12}\pi\Delta$ which is to be a carrier of the target line fillet is synthesized from $\Gamma^1\pi\Delta$ and $\Gamma^2\pi\Delta$. For this purpose, the reference plane $\pi_{12}$ is the plane of which the normal is in the direction of the resultant vector of the unit normal vectors of planes $\pi_1$ and $\pi_2$.

Next, the boundaries $\partial\gamma^1$ and $\partial\gamma^2$ of the subsets of simplex patches and the common curve segment $\partial\gamma^{12}$ are approximated by a polygonal line connecting the vertices of the simplex patches and are projected onto the reference plane $\pi_{12}$. In FIG. 7, the projected boundaries and common curve segment are $\partial\gamma^1\pi\Delta$, $\partial\gamma^2\pi\Delta$ and $\partial\gamma^{12}\pi\Delta$. $\Gamma^1\pi\Delta$ shown in procedure 211 is mapped onto the reference plane $\pi_{12}$ so that the boundaries have one-to-one correspondence. Similarly, $\Gamma^2\pi\Delta$ shown in the procedure 212 is also mapped onto the reference plane $\pi_{12}$. In this case, the simplex nodes that exist on the common curve segment $\partial\gamma^{12}\pi\Delta$ will be shared by the mapped simplices on both sides. If they are not shared, some of the nodes on the segments $\partial\gamma^{12}\pi\Delta$ can be moved or the simplex concerned can be subdivided into smaller simplices so that these simplex nodes may be shared by the simplices on both sides. In this way, a simplicial complex $\Gamma^{12}\pi\Delta$ is generated which can then serve as a carrier of the target line fillet.

Next, the discrete variational problem of the simplicial complex $\Gamma^{12}\pi\Delta$ is solved. In this case, the boundary conditions on $\partial\gamma^1\pi\Delta$ and $\partial\gamma^2\pi\Delta$ are determined so that the parameters (shown in FIG. 6) already obtained for the corresponding boundaries of $\Gamma^1\pi\Delta$ and $\Gamma^2\pi\Delta$ can also be used successively. It is also possible to use a set of intraplane restraint points representing the common curve segment $\partial\gamma^{12}$. In this case, the common curve segment $\partial\gamma^{12}\pi\Delta$ is the corresponding set of reference restraint points. As a result, as shown in procedure 230, a line fillet $\Gamma^{12}$ that connects the superpatches $\Gamma^1$ and $\Gamma^2$ smoothly is generated as a new superpatch.

Thus, if the common curve segment $\partial\Gamma^{12}$ is used to define a set of intraplane restraint points, the effect is then similar to the arrangement of FIGS. 1 to 3, with the line fillet $\Gamma^{12}$ corresponding to the area $\Gamma$ in FIG. 3, and the common curve segment $\partial\gamma^{12}$ corresponding to the line C.

These procedures can all be carried out automatically. The operator need only identify the common curve segment $\partial\gamma^{12}$ displayed on the display to execute the above sequence of procedures.

Figure 8:
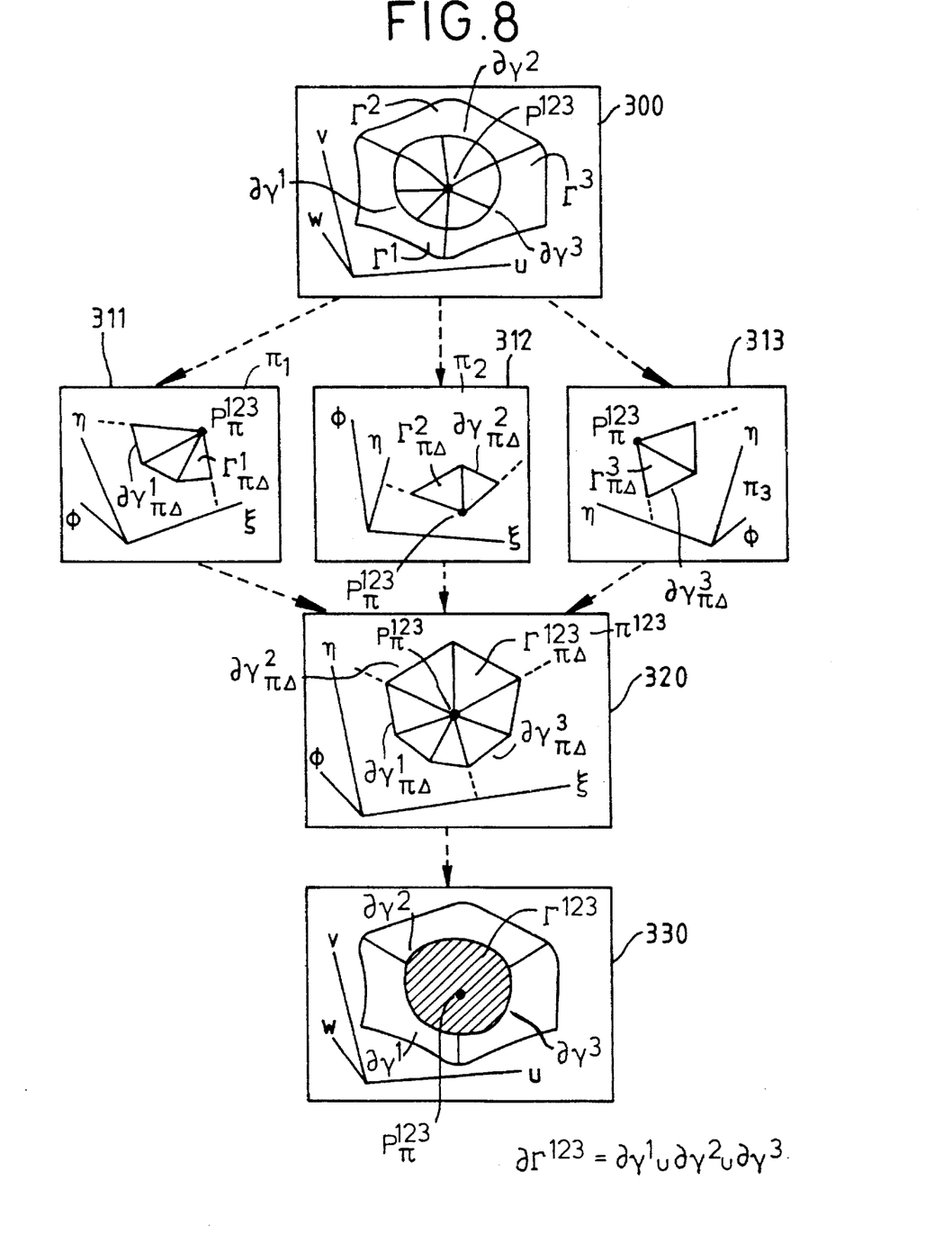
FIG. 8 shows the generation of a fillet surface corresponding to the joining of a plurality of patches at a common point.

Next, an embodiment illustrating a method of generating a point fillet, which corresponds to procedure P4 of FIG. 2, will be described referring to FIG. 8. When three or more superpatches whose source patches comprise line fillets adjoin each other at a point, a point fillet which is a generated superpatch smoothly connecting the three or more superpatches at and around the point is generated. As additional conditions, it is assumed that these adjoining superpatches are all represented discretely and that when two source superpatches adjoining each other at a boundary curve are included in the discretely represented adjoining superpatches, the line fillets are also included in the latter. For simplicity, consider the case shown in procedure 300 where three discretely represented superpatches $\Gamma^1$, $\Gamma^2$, $\Gamma^3$ exist in a common coordinate system (u, v, w) and adjoin each other at a common point $P^{123}$.

The procedure for generating a point fillet that smoothly connects these three superpatches $\Gamma^1\Gamma^2$, $\Gamma^3$ through the common point $P^{123}$ will now be explained. For each of the three superpatches $\Gamma^1$, $\Gamma^2$, $\Gamma^3$, a subset of simplex patches which have the common point $P^{123}$ as their nodes is chosen from the set of simplex patches making up the superpatch. The subsets thus obtained are separated from the original set. The boundaries of these subsets are $\partial\gamma^1$, $\partial\gamma^2$, $\partial\gamma^3$, as shown. These boundaries, under the above-mentioned additional conditions, form a continuous boundary as a whole.

Next, in procedure 311, from the simplicial complex accompanying the superpatch $\Gamma^1$, simplices corresponding to the subset of the simplex patches are extracted to form a set $\Gamma^1\pi\Delta$. $\partial\gamma^1\pi\Delta$ and $P^{123}\pi$ correspond to the boundary $\partial\gamma^1$ and point $P^{123}$ respectively. The plane $\pi_1$ is a reference plane that defines the local coordinate system ($\xi$, $\eta$, $\phi$) of the superpatch $\Gamma^1$. In procedures 312 and 313, a similar operation to procedure 311 is carried out for the superpatches $\Gamma^2$, $\Gamma^3$. Then in procedure 320, $\Gamma^1\pi\Delta$, $\Gamma^2\pi\Delta$ and $\Gamma^3\pi\Delta$ are combined to form a simplicial complex $\Gamma^{123}$ which is to serve as a carrier of the target point fillet. For this purpose, the reference plane $\pi_{123}$ is defined so that the normal thereto corresponds to the direction of the resultant vector of the unit normal vectors of $\pi_1\pi_2$ and $\pi_3$.

Next, a polygonal line connecting the vertices of simplex patches to approximate the boundaries $\partial\gamma^1$, $\partial\gamma^2$, $\partial\gamma^3$ of the subsets of simplex patches and the common point $P^{123}$ are projected onto the reference plane $\pi_{123}$ to obtain boundary $\partial\gamma^1\pi\Delta$, $\partial\gamma^2\pi\Delta$, $\partial\gamma^3\pi\Delta$ and point $P^{123}\pi$. Then, $\Gamma^1\pi\Delta$ shown in procedure 311 is mapped onto the reference plane $\pi_{123}$ so that its boundary has one-to-one correspondence. Likewise, $\Gamma^2\pi\Delta$ and $\Gamma^3\pi\Delta$ are mapped onto the reference plane $\pi_{123}$. In this way, a simplicial complex $\Gamma^{123}\pi\Delta$ that is to serve as a carrier for the target point fillet is generated.

Then, the discrete variational problem of the simplicial complex $\Gamma^{123}\pi\Delta$ will be solved. At this time, the boundary conditions for $\partial\gamma^1\pi\Delta$, $\partial^{65}$ $^2\pi\Delta$, $\partial\gamma^3\pi\Delta$ are determined so the parameters (shown in FIG. 6) already obtained for the corresponding boundaries of $\Gamma^1\pi\Delta$, $\Gamma^2\pi\Delta$, $\Gamma^3\pi\Delta$ can be used successively. It is also possible to use a set of intraplane restraint points as the common point $P^{123}$. In this case, $P^{123}\pi$ in the $\Gamma^{123}$ is a corresponding set of the intraplane restraint points. As a result, as shown in procedure 330, a point fillet $\Gamma^{123}$ that connects the superpatches $\Gamma^1$, $\Gamma^2$, $\Gamma^3$ smoothly is obtained as a new superpatch.

As is evident from the above description, these procedures can all be carried out automatically. The operator need only identify the common point $P^{123}$ displayed on the display device to instruct the above sequence of procedures.

The present invention allows a designer to generate a desired surface shape quickly and easily and display the generated surface on a display device, enhancing the ease of operation of the surface generating apparatus so even an inexperienced person can easily use the apparatus.

What is claimed is:

1. A method of generating a display of a surface, comprising the steps of:

storing a program containing a surface generation control procedure in a program memory;

storing data representing said surface in a surface data memory;

loading the program stored in the program memory into a central processing unit;.

generating, with the central processing unit under control of the program based on the data stored in the surface data memory, an equation corresponding to said surface, said equation being a differential equation representing said surface as a physical membrane;

specifying, with the central processing unit under control of the program, boundary conditions of a boundary of said surface, thereby to define outer constraints for said equation;

specifying, with the central processing unit under control of the program, a set of points within said boundary of said surface, thereby to define inner constraints for said equation;

solving, with the central processing unit under control of the program, said equation to generate a solution, using said inner and outer constraints;

generating, with the central processing unit under control of the program, a display of said surface from said solution of said equation; and displaying, with the central processing unit under control of the program, said display of said surface on a display device.

2. A method according to claim 1, wherein said set of points is a plurality of discrete points.

3. A method according to claim 1, wherein said set of points defines at least one line.

4. A method according to claim 1, wherein said set of points defines at least one area.

5. A method according to claim 1, wherein said step of specifying said set of points includes the step of identifying, with the central processing unit under control of the program, locations of said points on said display device.

6. A method of generating a display of a surface, comprising the steps of:

storing a program containing a surface generation control procedure in a program memory;

storing data representing said surface in a surface data memory;

loading the program stored in the program memory into a central processing unit;

generating, with the central processing unit under control of the program based on the data stored in the surface data memory, a plurality of first equations, each of said plurality of first equations representing a corresponding first surface part of said surface, said corresponding first surface parts meeting at a join, each of said plurality of first equations being a differential equation representing the corresponding first surface part as a physical membrane;

specifying, with the central processing unit under control of the program, boundary conditions of boundaries of said corresponding first surface parts, thereby to define a plurality of outer constraints for said plurality of first equations;

solving, with the central processing unit under control of the program, said plurality of first equations to generate a plurality of first solutions using said plurality of outer constraints;

defining, with the central processing unit under control of the program, a join area, said join area including at least some of each of said plurality of first surface parts adjacent said join;

generating, with the central processing unit under control of the program, a second equation corresponding to said join area, said second equation being a differential equation representing the join area as a physical membrane;

solving, with the central processing unit under control of the program, said second equation preserving a boundary of said join area, thereby to define a fillet surface; and generating, with the central processing unit under control of the program, a display of said surface from the plurality of first solutions and said fillet surface, and displaying said display of said surface on a display device.

7. A method according to claim 6, wherein said plurality of first surface parts is two first surface parts, and said join is a line.

8. A method according to claim 6, wherein said plurality of first surface parts is at least three first surface parts, and said join is a point.

9. A method according to claim 6, wherein said join defines an inner constraint for said second equation; and wherein the step of solving said second equation includes the step of solving, with the central processing unit under control of the program, said second equation using said inner constraint.

10. A method according to claim 6, wherein the step of defining said join area includes the step of specifying, with the central processing unit under control of the program, a location of said join on said display device.

11. An apparatus for generating a display of a surface, comprising:

a central processing unit;

a program memory for storing a program containing a surface generation control procedure;

a surface data memory for storing data representing said surface;

means for loading the program stored in the program memory into the central processing unit;

means, constituted by the central processing unit operating under control of the program, for generating an equation corresponding to said surface based on the data stored in the surface data memory, said equation being a differential equation representing said surface as a physical membrane;

means, constituted by the central processing unit operating under control of the program, for specifying boundary conditions of a boundary of said surface, thereby to define outer constraints for said equation;

means, constituted by the central processing unit operating under control of the program, for specifying a set of points within said boundary of said surface, thereby to define inner constraints for said equation;

means, constituted by the central processing unit operating under control of the program, for solving said equation to generate a solution, using said inner and outer constraints; and means, constituted by the central processing unit operating under control of the program, for generating a display of said surface from said solution of said equation; and a display device for displaying said display.

12. An apparatus according to claim 11, wherein said means for specifying said set of points includes means, constituted by the central processing unit operating under control of the program, for identifying locations of said points on said display device.

13. An apparatus for generating a display of a surface, comprising:

a central processing unit;

a program memory for storing a program containing a surface generation control procedure;

a surface data memory for storing data representing said surface;

means for loading the program stored in the program memory into the central processing unit;

means, constituted by the central processing unit operating under control of the program, for generating a plurality of first equations based on the data stored in the surface data memory, each of said plurality of first equations representing a corresponding first surface part of said surface, said corresponding first surface parts meeting at a join, each of said plurality of first equations being a differential equation representing the corresponding first surface part as a physical membrane;

means, constituted by the central processing unit operating under control of the program, for specifying boundary conditions of boundaries of said corresponding first surface parts, thereby to define a plurality of outer constraints for said plurality of first equations;

means, constituted by the central processing unit operating under control of the program, for solving said plurality of first equations to generate a plurality of first solutions using said plurality of outer constraints;

means, constituted by the central processing unit operating under control of the program, for defining a join area, said join area including at least some of each of said plurality of first surface parts adjacent said join;

means, constituted by the central processing unit operating under control of the program, for generating a second equation corresponding to said join area, said second equation being a differential equation representing the join area as a physical membrane;

means, constituted by the central processing unit operating under control of the program, for solving said second equation preserving a boundary of said join area, thereby to define a fillet surface; and means, constituted by the central processing unit operating under control of the program, for generating a display of said surface from the plurality of first solutions and said fillet surface; and a display device for displaying said display.

14. An apparatus according to claim 13, wherein said means for defining said join area includes means, constituted by the central processing unit operating under control of the program, for identifying a location of said join on said display device.

* * * * *